(12) United States Patent
Zähe

(10) Patent No.: US 10,775,812 B1
(45) Date of Patent: Sep. 15, 2020

(54) INVERSE PROPORTIONAL PRESSURE RELIEF VALVE

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

(*) Notice: Subject to any disclaimer, the term of this patent is extended or adjusted under 35 U.S.C. 154(b) by 87 days.

(21) Appl. No.: 16/254,001

(22) Filed: Jan. 22, 2019

(51) Int. Cl.
*G05D 16/20* (2006.01)
*F15B 13/02* (2006.01)
*F15B 13/042* (2006.01)
*F15B 13/044* (2006.01)

(52) U.S. Cl.
CPC ....... *G05D 16/2097* (2019.01); *F15B 13/024* (2013.01); *F15B 13/025* (2013.01); *F15B 13/0426* (2013.01); *F15B 13/0442* (2013.01); *G05D 16/2013* (2013.01); *Y10T 137/777* (2015.04); *Y10T 137/7766* (2015.04); *Y10T 137/7769* (2015.04)

(58) Field of Classification Search
CPC ............ G05D 16/2097; G05D 16/2013; Y10T 137/7766; Y10T 137/7769; Y10T 137/777; F15B 13/024; F15B 13/025; F15B 13/0426; F15B 13/0442
USPC ...................................... 137/491, 492, 492.5
See application file for complete search history.

(56) References Cited

U.S. PATENT DOCUMENTS

| | | | | |
|---|---|---|---|---|
| 2,575,272 A | * | 11/1951 | Harris | F16K 31/408 251/30.04 |
| 4,109,726 A | * | 8/1978 | Hansen | A62C 37/44 169/11 |
| 4,305,566 A | * | 12/1981 | Grawunde | F16K 31/406 137/491 |
| 4,454,982 A | * | 6/1984 | Reick | G05D 23/022 137/491 |
| 4,456,170 A | * | 6/1984 | Weigle | F15B 21/042 137/491 |
| 4,526,201 A | * | 7/1985 | Geyler, Jr. | F15B 13/0403 137/625.63 |
| 4,799,645 A | * | 1/1989 | Kramer | F16K 31/406 251/30.04 |

(Continued)

OTHER PUBLICATIONS

"Proportional Pressure Relief Valve Inverse Controlled Spool Type, Pilot-Operated Cartridge", dated Jan. 1, 2013.

*Primary Examiner* — William M McCalister
(74) *Attorney, Agent, or Firm* — McDonnell Boehnen Hulbert & Berghoff LLP

(57) ABSTRACT

An example valve includes: a pilot seat member comprising: a channel that is fluidly coupled to a first port of the valve, a pilot seat, and one or more cross-holes fluidly coupled to a second port of the valve; a pilot check member configured to be subjected to a fluid force of fluid in the channel of the pilot seat member acting on the pilot check member in a proximal direction; a solenoid actuator sleeve comprising a chamber; a first setting spring disposed in the chamber and configured to bias the solenoid actuator sleeve in a distal direction; and a second setting spring configured to bias the pilot check member in the distal direction, such that the first setting spring and the second setting spring cooperate to apply a biasing force in the distal direction on the pilot check member toward the pilot seat against the fluid force.

20 Claims, 6 Drawing Sheets

(56) References Cited

U.S. PATENT DOCUMENTS

| | | | | |
|---|---|---|---|---|
| 4,873,817 A * | 10/1989 | Harms | A01D 41/141 | |
| | | | 56/10.2 F | |
| 5,381,823 A * | 1/1995 | DiBartolo | F16K 17/065 | |
| | | | 137/494 | |
| 5,769,386 A * | 6/1998 | Sugiura | G05D 16/2097 | |
| | | | 251/37 | |
| 5,836,335 A * | 11/1998 | Harms | F15B 13/0402 | |
| | | | 137/14 | |
| 6,039,070 A * | 3/2000 | Zaehe | G05D 16/106 | |
| | | | 137/491 | |
| 6,116,263 A * | 9/2000 | Liberfarb | F15B 11/055 | |
| | | | 137/115.03 | |
| 6,378,557 B2 * | 4/2002 | Kawamura | F16H 61/0251 | |
| | | | 137/625.64 | |
| 7,779,853 B2 * | 8/2010 | Reilly | F15B 13/0402 | |
| | | | 137/14 | |
| 8,397,758 B2 * | 3/2013 | Hillesheim | G05D 16/2024 | |
| | | | 137/625.68 | |
| 8,733,391 B2 * | 5/2014 | Jeon | F15B 13/024 | |
| | | | 137/488 | |
| 9,273,702 B2 * | 3/2016 | Grawunde | F16K 17/065 | |
| 9,322,416 B2 * | 4/2016 | Bissbort | F15B 11/167 | |
| 9,850,919 B2 * | 12/2017 | Zaehe | F15B 13/015 | |
| 10,437,269 B1 * | 10/2019 | Zahe | F16K 17/044 | |
| 10,495,117 B1 * | 12/2019 | Pena | F15B 11/003 | |
| 2003/0106588 A1 * | 6/2003 | Zahe | G05D 16/106 | |
| | | | 137/491 | |
| 2003/0131889 A1 * | 7/2003 | Kim | G05D 16/106 | |
| | | | 137/491 | |
| 2005/0178443 A1 * | 8/2005 | Cheong | F16K 17/105 | |
| | | | 137/491 | |
| 2006/0201554 A1 * | 9/2006 | Prinsen | F16K 17/0433 | |
| | | | 137/491 | |
| 2006/0266419 A1 * | 11/2006 | Krug-Kussius | F16K 17/105 | |
| | | | 137/491 | |
| 2009/0050222 A1 * | 2/2009 | Jackson | F15B 11/042 | |
| | | | 137/625.65 | |
| 2012/0305108 A1 * | 12/2012 | Jerchen | F16K 17/105 | |
| | | | 137/488 | |
| 2016/0091101 A1 * | 3/2016 | Neubauer | F16K 31/406 | |
| | | | 137/625.18 | |

* cited by examiner

INVERSE PROPORTIONAL PRESSURE RELIEF VALVE

BACKGROUND

A relief valve or pressure relief valve (PRV) is a type of safety valve used to control or limit the pressure in a system. Pressure might otherwise build up and can cause equipment failure. The pressure is relieved by allowing the pressurized fluid to flow out of the system to a tank or low pressure fluid reservoir. In some applications, a PRV can be used to build pressure level of fluid up to a particular pressure level to operate a hydraulic system or component.

A PRV is designed or set to open at a predetermined setting pressure to protect other components and other equipment from being subjected to pressures that exceed their design limits. When the setting pressure is exceeded, the PRV becomes or forms the "path of least resistance" as the PRV is forced open and a portion of fluid is diverted to the tank. As the fluid is diverted, the pressure inside the system stops rising. Once the pressure is reduced and reaches the PRV's reseating pressure, the PRV closes.

SUMMARY

The present disclosure describes implementations that relate to an inverse proportional pressure relief valve.

In a first example implementation, the present disclosure describes a valve. The valve includes: (i) a pilot seat member comprising: (a) a channel that is fluidly coupled to a first port of the valve, (b) a pilot seat, and (c) one or more cross-holes fluidly coupled to a second port of the valve; (ii) a pilot check member configured to be seated at the pilot seat when the valve is closed to block fluid flow from the channel to the one or more cross-holes of the pilot seat member, wherein the pilot check member is configured to be subjected to a fluid force of fluid in the channel of the pilot seat member acting on the pilot check member in a proximal direction; (iii) a solenoid actuator sleeve comprising a chamber therein; (iv) a first setting spring disposed in the chamber within the solenoid actuator sleeve and configured to bias the solenoid actuator sleeve in a distal direction; and (v) a second setting spring disposed about an exterior peripheral surface of the solenoid actuator sleeve and configured to bias the pilot check member in the distal direction, such that the first setting spring and the second setting spring cooperate to apply a biasing force in the distal direction on the pilot check member toward the pilot seat against the fluid force.

In a second example implementation, the present disclosure describes a hydraulic system including a source of fluid; a tank; and a valve having a first port fluidly coupled to the source of fluid, and a second port fluidly coupled to the tank. The valve comprises: (i) a pilot seat member comprising: (a) a channel that is fluidly coupled to the first port of the valve, (b) a pilot seat, and (c) one or more cross-holes fluidly coupled to the second port of the valve; (ii) a pilot check member configured to be subjected to a fluid force of fluid in the channel of the pilot seat member acting on the pilot check member in a proximal direction; (iii) a solenoid actuator sleeve comprising a chamber therein; (iv) a first setting spring disposed in the chamber within the solenoid actuator sleeve and configured to bias the solenoid actuator sleeve in a distal direction; and (v) a second setting spring disposed about an exterior peripheral surface of the solenoid actuator sleeve and configured to bias the pilot check member in the distal direction, such that the first setting spring and the second setting spring cooperate to apply a biasing force in the distal direction on the pilot check member toward the pilot seat against the fluid force.

In a third example implementation, the present disclosure describes a valve. The valve includes: (i) a housing having a longitudinal cylindrical cavity therein and having one or more cross-holes disposed in an exterior peripheral surface of the housing; (ii) a main sleeve disposed, at least partially, in the longitudinal cylindrical cavity of the housing, wherein the main sleeve includes a first port at a distal end of the main sleeve and includes one or more cross-holes disposed on an exterior peripheral surface of the main sleeve, wherein the one or more cross-holes of the housing and the one or more cross-holes of the main sleeve form a second port; (iii) a piston disposed within the main sleeve and configured to be axially movable therein, wherein the piston comprises a main chamber therein, wherein the main chamber of the piston is fluidly coupled to the first port; (iv) a pilot seat member comprising: (a) a channel that is fluidly coupled to the first port of the valve, (b) a pilot seat, and (c) one or more cross-holes fluidly coupled to the second port of the valve, wherein the main chamber of the piston is fluidly coupled to the channel of the pilot seat member; (v) a pilot check member configured to be subjected to a fluid force of fluid in the channel of the pilot seat member acting on the pilot check member in a proximal direction; (vi) a solenoid actuator sleeve comprising a chamber therein; (vii) a first setting spring disposed in the chamber within the solenoid actuator sleeve and configured to bias the solenoid actuator sleeve in a distal direction; and (viii) a second setting spring disposed about an exterior peripheral surface of the solenoid actuator sleeve and configured to bias the pilot check member in the distal direction, such that the first setting spring and the second setting spring cooperate to apply a biasing force in the distal direction on the pilot check member toward the pilot seat against the fluid force.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Pressure relief valves are configured to open at a preset fluid pressure and discharge fluid until pressure drops to acceptable levels in a hydraulic system. In operation, the pressure relief valve can remain normally-closed until pressure upstream reaches a desired setting pressure. The valve can then "crack" open when the setting pressure is reached, and continue to open further, allowing more flow as pressure increases. When upstream pressure falls below the setting pressure, the valve can close again.

In some examples, it may be desirable to have a pressure relief valve with a pressure relief setting that can be changed by an actuation signal (e.g., with an electrical signal). For example, operating conditions of an actuator of a machine including the pressure relief valve can change. Accordingly, it may be desirable to change the pressure level at which the pressure relief opens and diverts fluid to a tank. For instance, under some loads, it may be desirable to have a high pressure relief setting (e.g., 5000 pounds per square inch (psi)) so as to accelerate the actuator. Once the actuator reaches a desired speed, the valve can be actuated to reduce the pressure relief setting to a pressure level that is less than the high pressure level. For instance, the pressure relief setting can be reduced proportionally to a level between 1000 and 3000 psi). This way, the valve allows fluid to be provided to the actuator at a lower pressure level to maintain its speed. In other examples, the pressure relief valve can be coupled to an outlet of a fluid source (e.g., a pump) and its pressure relief setting can be changed so as to change pressure level of fluid provided by the fluid source to other components of a hydraulic system.

It may also be desirable to have a pressure relief valve that has a high resolution such that small changes in an actuation signal respectively correspond to small changes in the pressure relief setting. It is also desirable to have such valve be stable during its range of operation to enhance performance of the hydraulic system including the valve.

Disclosed herein is a pressure relief valve configured to reduce its pressure relief setting proportionally in response to a solenoid actuation signal. The valve includes a pilot stage that is decoupled from a solenoid actuator so as to enhance valve resolution and stability. The valve further includes a manual adjustment actuator to change a maximum pressure relief setting of the valve.

Figure 1:
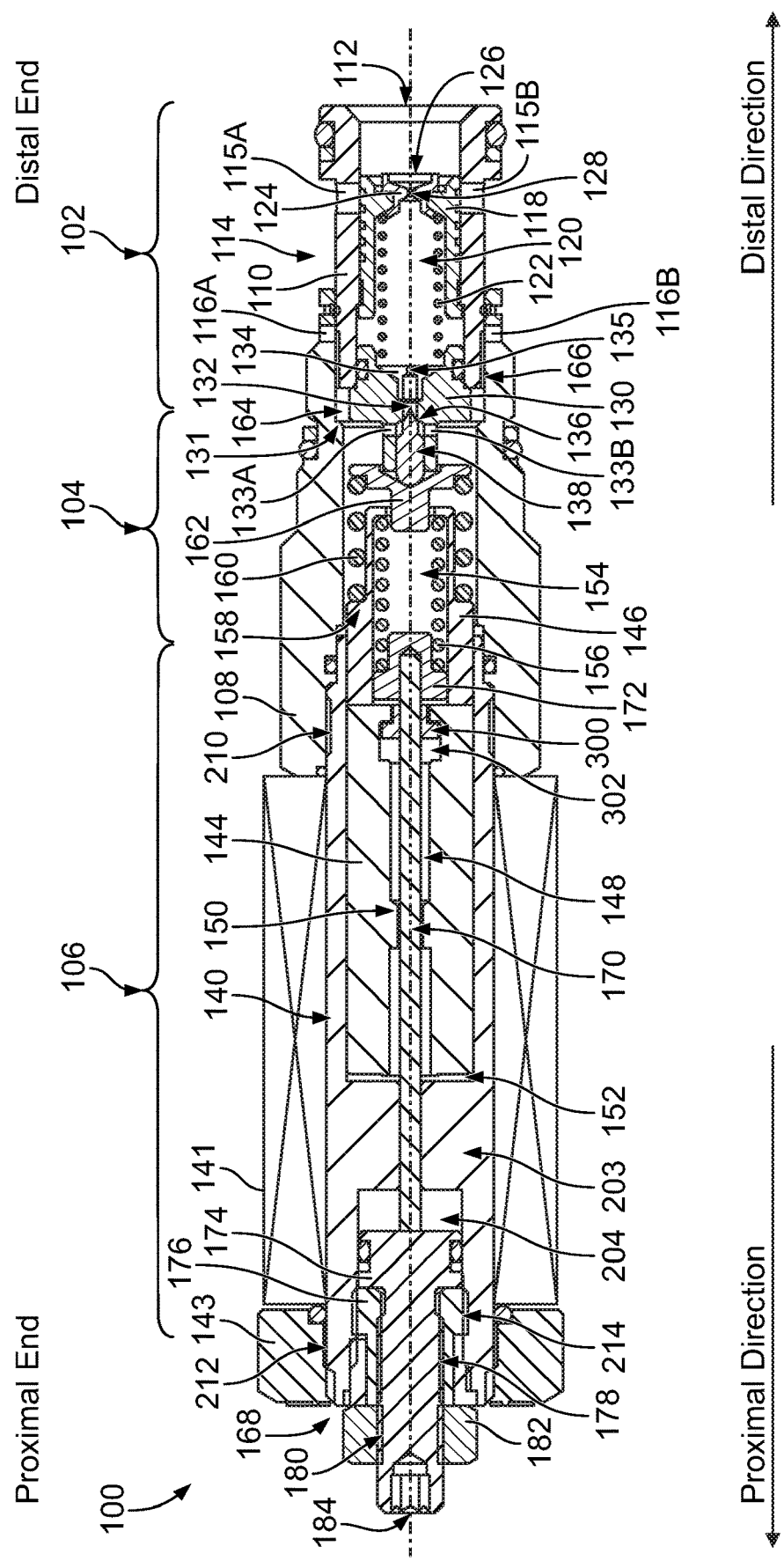
FIG. 1 illustrates a cross-sectional side view of a valve, in accordance with an example implementation.

FIG. 1 illustrates a cross-sectional side view of a valve 100, in accordance with an example implementation. The valve 100 may be inserted or screwed into a manifold having ports corresponding to ports of the valve 100 described below, and can thus fluidly coupled the valve 100 to other components of a hydraulic system.

The valve 100 includes a main stage 102, a pilot stage 104, and a solenoid actuator 106. The valve 100 includes a housing 108 that includes a longitudinal cylindrical cavity therein. The longitudinal cylindrical cavity of the housing 108 is configured to house portions of the main stage 102, the pilot stage 104, and the solenoid actuator 106.

The main stage 102 includes a main sleeve 110 received at a distal end of the housing 108, and the main sleeve 110 is coaxial with the housing 108. The valve 100 includes a first port 112 and a second port 114. The first port 112 is defined at a nose or distal end of the main sleeve 110. The second port 114 can include a first set of cross-holes that can be referred to as main flow cross-holes, such as main flow cross-holes 115A, 115B, disposed in a radial array about the main sleeve 110. The second port 114 can also include a second set of cross-holes that can be referred to as pilot flow cross-holes, such as pilot flow cross-holes 116A, 116B disposed in the housing 108.

The main sleeve 110 includes a respective longitudinal cylindrical cavity therein. The valve 100 includes a piston 118 that is disposed, and slidably accommodated, in the longitudinal cylindrical cavity of the main sleeve 110. The term "piston" is used herein to encompass any type of movable element, such as a spool-type movable element or a poppet-type movable element. The piston 118 is shown in the figures as a spool-type movable element; however, it is contemplated that a poppet-type movable element can be used instead. In the case a poppet-type movable element is used, the inner peripheral surface of the main sleeve 110 can form a protrusion that operates as a seat for the poppet-type movable element and reduce leakage through the valve 100.

Further, the term "slidably accommodated" is used throughout herein to indicate that a first component (e.g., the piston 118) is positioned relative to a second component (e.g., the main sleeve 110) with sufficient clearance therebetween, enabling movement of the first component relative to the second component in the proximal and distal directions. As such, the first component (e.g., piston 118) is not stationary, locked, or fixedly disposed in the valve 100, but rather, is allowed to move relative to the second component (e.g., the main sleeve 110).

The piston 118 has a cavity or main chamber 120 therein, and the valve 100 includes a main spring 122 disposed in the main chamber 120 of the piston 118. The valve 100 also includes a ring-shaped member 124 disposed, at least partially, within the piston 118 at a distal end thereof. The ring-shaped member 124 includes a filter 126 and forms therein an orifice 128 that fluidly couples the first port 112 to the main chamber 120.

The valve 100 further includes a pilot seat member 130 fixedly disposed at the proximal end of in the main sleeve 110 within the cavity of the housing 108. As shown in FIG. 1, the pilot seat member 130 has a shoulder formed by an exterior peripheral surface of the pilot seat member 130. The shoulder interfaces with the proximal end of the main sleeve 110 and interfaces with a shoulder 131 formed as a protrusion from an interior peripheral surface of the housing 108. As such, the pilot seat member 130 is fixedly disposed within the housing 108.

The main spring 122 is disposed in the main chamber 120 such that a distal end of the main spring 122 rests against the interior surface of the piston 118 and a proximal end of the main spring 122 rests against the pilot seat member 130. The pilot seat member 130 is fixed, and thus the main spring 122 biases the piston 118 in the distal direction (to the right in FIG. 1). The distal direction can also be referred to as a closing direction. The main spring 122 can be configured as a weak spring, e.g., a spring with a spring rate of 8 pound-force/inch (lbf/in) causing a 2 pound-force (lbf) biasing force on the piston 118. With such a low spring rate, a low pressure level differential across the orifice 128, e.g., pressure level differential of 25 psi, can cause the piston 118 to move in the proximal direction against the biasing force of the main spring 122.

The pilot seat member 130 has a longitudinal channel 132 and radial cross-holes disposed in a radial array about the pilot seat member 130, such as radial cross-holes 133A, 133B. The valve 100 includes a ring-shaped member 134 disposed, at least partially, within the pilot seat member 130 at a distal end thereof. The ring-shaped member 134 forms therein an orifice 135 that fluidly couples the main chamber 120 to the longitudinal channel 132.

The pilot seat member 130 forms a pilot seat 136. The pilot stage 104 of the valve 100 includes a pilot check member 138 (e.g., a pilot poppet) configured to be seated at the pilot seat 136 when the valve 100 is closed, thereby blocking fluid communication from the longitudinal channel 132 to the radial cross-holes 133A, 133B. In particular, with the configuration shown in FIG. 1, the pilot check member 138 is configured as a poppet having a nose section that tapers gradually, such that an exterior surface of the nose section of the poppet is seated at the pilot seat 136 to block fluid flow when the valve 100 is closed.

As shown in FIG. 1, the pilot check member 138 is disposed, at least partially, within the pilot seat member 130 and is slidably accommodated therein. The pilot check member 138 is thus guided by an interior peripheral surface of the pilot seat member 130 when the pilot check member 138 moves axially in a longitudinal direction.

The solenoid actuator 106 includes a solenoid tube 140 configured as a cylindrical housing or body disposed within and received at a proximal end of the housing 108, such that the solenoid tube 140 is coaxial with the housing 108. A solenoid coil 141 can be disposed about an exterior surface of the solenoid tube 140. The solenoid coil 141 is retained between a proximal end of the housing 108 and a coil nut 143 having internal threads that can engage a threaded region formed on the exterior peripheral surface of the solenoid tube 140 at its proximal end.

Figure 2:
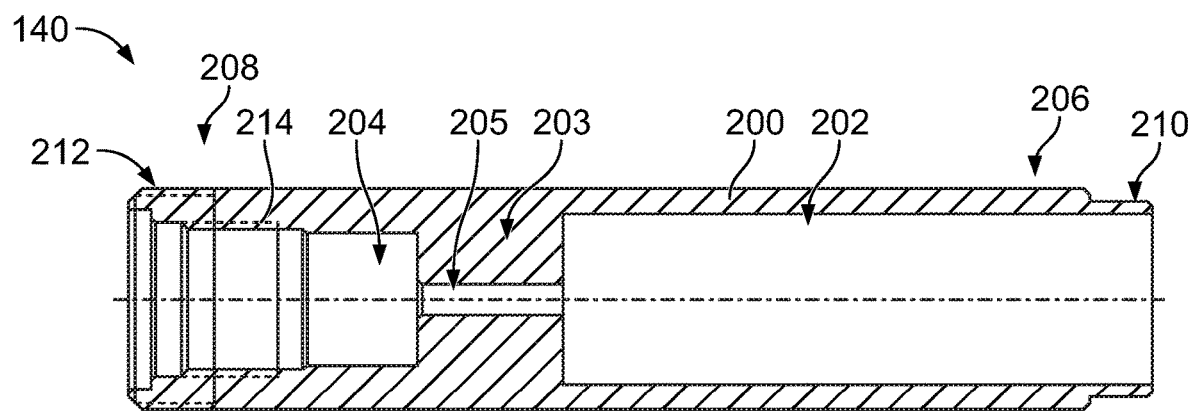
FIG. 2 illustrates a cross-sectional side view of a solenoid tube, in accordance with an example implementation.

FIG. 2 illustrates a cross-sectional side view of the solenoid tube 140, in accordance with an example implementation. As depicted, the solenoid tube 140 has a cylindrical body 200 having therein a first chamber 202 within a distal side of the cylindrical body 200 and a second chamber 204 within a proximal side of the cylindrical body 200. The solenoid tube 140 includes a pole piece 203 formed as a protrusion within the cylindrical body 200. The pole piece 203 separates the first chamber 202 from the second chamber 204. In other words, the pole piece 203 divides a hollow interior of the cylindrical body 200 into the first chamber 202 and the second chamber 204. The pole piece 203 can be composed of material of high magnetic permeability.

Further, the pole piece 203 defines a channel 205 therethrough. In other words, an interior peripheral surface of the solenoid tube 140 at or through the pole piece 203 forms the channel 205, which fluidly couples the first chamber 202 to the second chamber 204. As such, pressurized fluid provided to the first chamber 202 is communicated through the channel 205 to the second chamber 204.

In examples, the channel 205 can be configured to receive a pin therethrough so as to transfer linear motion of one component in the second chamber 204 to another component in the first chamber 202 and vice versa, as described below. As such, the channel 205 can include chamfered circumferential surfaces at its ends (e.g., an end leading into the first chamber 202 and another end leading into the second chamber 204) to facilitate insertion of such a pin therethrough.

The solenoid tube 140 has a distal end 206, which is configured to be coupled to the housing 108, and a proximal end 208. Particularly, the solenoid tube 140 can have a first threaded region 210 disposed on an exterior peripheral surface of the cylindrical body 200 at the distal end 206 that is configured to threadedly engage with corresponding threads formed in the interior peripheral surface of the housing 108.

Also, the solenoid tube 140 can have a second threaded region 212 disposed on the exterior peripheral surface of the cylindrical body 200 at the proximal end 208 and configured to be threadedly engaged with corresponding threads formed in the interior peripheral surface of the coil nut 143. Further, the solenoid tube 140 can have a third threaded region 214 disposed on an interior peripheral surface of the cylindrical body 200 at the proximal end 208 and configured to threadedly engage with corresponding threads formed in a component of a manual adjustment actuator 168 as described below (see FIG. 1). The solenoid tube 140 can also have one or more shoulders formed in the interior peripheral surface of the cylindrical body 200 that can mate with respective shoulders of the manual adjustment actuator 168 to enable alignment of the manual adjustment actuator 168 within the solenoid tube 140.

Referring back to FIG. 1, the solenoid tube 140 is configured to house an armature 144 in the first chamber 202. The armature 144 is slidably accommodated within the solenoid tube 140 (i.e., the armature 144 can move axially within the solenoid tube 140).

The solenoid actuator 106 further includes a solenoid actuator sleeve 146 received at the proximal end of the housing 108 and also disposed partially within a distal end of the solenoid tube 140. The armature 144 is mechanically coupled to, or linked with, the solenoid actuator sleeve 146. As such, if the armature 144 moves axially (e.g., in the proximal direction), the solenoid actuator sleeve 146 moves along with the armature 144 in the same direction.

Figure 3:
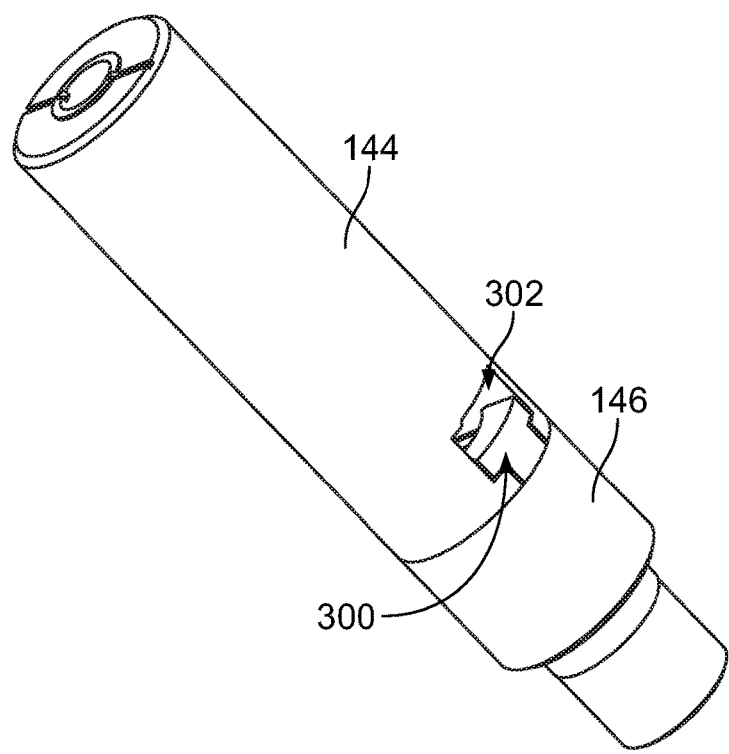
FIG. 3 illustrates a three-dimensional partial perspective view showing an armature coupled to a solenoid actuator sleeve, in accordance with another example implementation.

The armature 144 can be coupled to the solenoid actuator sleeve 146 in several ways. FIG. 3 illustrates a three-dimensional partial perspective view showing the armature 144 coupled to the solenoid actuator sleeve 146, in accordance with an example implementation. As shown, the solenoid actuator sleeve 146 can have a male T-shaped member 300, and the armature 144 can have a corresponding female T-slot 302 formed as an annular internal groove configured to receive the male T-shaped member 300 of the solenoid actuator sleeve 146. With this configuration, the armature 144 and the solenoid actuator sleeve 146 are coupled to each other, such that if the armature 144 moves, the solenoid actuator sleeve 146 moves therewith.

Referring back to FIG. 1, the armature 144 includes a longitudinal channel 148 formed therein. The armature 144 further includes a protrusion 150 within the longitudinal channel 148. As mentioned above, the solenoid tube 140 includes the pole piece 203 formed as a protrusion within the cylindrical body 200. The pole piece 203 is separated from the armature 144 by the airgap 152.

The solenoid actuator sleeve 146 forms therein a chamber 154 configured to house a first setting spring 156. The first setting spring 156 is thus disposed within the solenoid actuator sleeve 146 and can interface with an interior peripheral surface of the solenoid actuator sleeve 146. Further, the solenoid actuator sleeve 146 has a distal section having a first outer diameter and a proximal section having a second outer diameter larger than the first outer diameter such that the solenoid actuator sleeve 146 forms a shoulder 158 at the transition between the distal section and the proximal section.

The valve 100 further includes a second setting spring 160 disposed about an exterior peripheral surface of the solenoid actuator sleeve 146. A proximal end of the second setting spring 160 rests against the shoulder 158 of the solenoid actuator sleeve 146, whereas a distal end of the second setting spring 160 rests against a pilot spring cap 162 disposed between the solenoid actuator sleeve 146 and the pilot check member 138. As depicted in FIG. 1, the pilot spring cap 162 interfaces with and contacts a proximal end of the pilot check member 138. Further, the pilot spring cap 162 is received at a distal end of the solenoid actuator sleeve 146 through a hole in the solenoid actuator sleeve 146, and thus the pilot spring cap 162 and the solenoid actuator sleeve 146 can slide or move axially relative to each other.

The first setting spring 156 can have a first spring constant or spring rate $k_1$, and the first setting spring 156 applies a biasing force on the solenoid actuator sleeve 146 in the distal direction. Similarly, the second setting spring 160 can have a second spring rate $k_2$, and the second setting spring 160 applies a biasing force in the distal direction on the pilot spring cap 162 and the pilot check member 138 interfacing therewith.

With the configuration of the valve 100 shown in FIG. 1, the first setting spring 156 and the second setting spring 160 are disposed in series with respect to the pilot spring cap 162 and the pilot check member 138. Particularly, any force applied to the pilot check member 138 is applied to each setting spring 156, 160 without change of magnitude, and the amount of strain (deformation) or axial motion of the pilot check member 138 is the sum of the strains of the individual setting springs 156, 160.

As such, the combination of the first setting spring 156 and the second setting spring 160 has an equivalent or effective spring rate $k_{eq}$ that is less than the respective spring rate of either spring. Particularly, the effective spring rate $k_{eq}$ can be determined as $$\frac{k_1 k_2}{k_1 + k_2}.$$

The effective spring rate $k_{eq}$ determines a magnitude of a biasing force applied on the pilot check member 138 in the distal direction by way of the combined action of the setting springs 156, 160. In other words, the first setting spring 156 and the second setting spring 160 cooperate to apply a biasing force on the pilot check member 138 in the distal direction. Such biasing force determines the pressure relief setting of the valve 100, where the pressure relief setting is the pressure level of fluid at the first port 112 at which the valve 100 can open to relieve fluid to the second port 114.

Specifically, based on the equivalent spring rate $k_{eq}$ of the setting springs 156, 160 and their respective lengths, the setting springs 156, 160 exert a particular preload or biasing force on the pilot spring cap 162 and pilot check member 138 in the distal direction, thus causing the pilot check member 138 to be seated at the pilot seat 136 of the pilot seat member 130. The pressure relief setting of the valve 100 can be determined by dividing the biasing force that the setting springs 156, 160 apply to the pilot check member 138 by an effective area of the pilot seat 136. The effective area of the pilot seat 136 can be estimated as a circular area having a diameter of the pilot seat 136, which can be slightly larger than the diameter the longitudinal channel 132. As an example for illustration, if the diameter of the pilot seat 136 is about 0.042 inch and the biasing force is about 6.9 pounds, then the pressure relief setting of the valve 100 can be about 5000 psi.

As shown in FIG. 1, the pilot seat member 130 includes a plurality of longitudinal channels or through-holes such as longitudinal through-hole 164 disposed in a radial array around the pilot seat member 130. Further, the longitudinal through-hole 164 is fluidly coupled to the pilot flow cross-holes 116A, 116B of the housing 108 via an annular undercut or annular groove 166 formed on the exterior peripheral surface of the main sleeve 110 at a proximal end thereof.

In operation, fluid at the first port 112 is communicated to the pilot check member 138 through the orifice 128, the main chamber 120, the orifice 135, and the longitudinal channel 132. The fluid applies a fluid force on the pilot check member 138 in the proximal direction. When pressure level of the fluid at the first port 112, which is communicated to the pilot check member 138, reaches or exceeds the pressure relief setting determined by the setting springs 156, 160, the fluid force overcomes and biasing force of the setting springs 156, 160 on the pilot check member 138. The fluid thus pushes the pilot check member 138 in the proximal direction (to the left in FIG. 1) off the pilot seat 136. As mentioned above, the predetermined pressure relief setting is determined by dividing a preload force that the setting springs 156, 160 apply to the pilot check member 138 (via the pilot spring cap 162) by the effective area of the pilot seat 136 (e.g., the circular area having the diameter of the pilot seat 136). As an example for illustration, the pilot check member 138 can move a distance of about 0.05 inches off the pilot seat 136.

As a result of the pilot check member 138 being unseated, a pilot flow path is formed and pilot fluid flow is generated from the first port 112 to the second port 114. Particularly, fluid at the first port 112 can flow through the orifice 128, the main chamber 120, the orifice 135, the longitudinal channel 132, then around the nose of the pilot check member 138, through the radial cross-holes 133A, 133B, the longitudinal through-hole 164, the annular groove 166, and the pilot flow cross-holes 116A, 116B to the second port 114. Such fluid flow from the first port 112 to the second port 114 through the pilot flow cross-holes 116A, 116B can be referred to as the pilot flow. As an example for illustration, the pilot flow can amount to about 0.15 gallons per minute (GPM).

The pilot flow through the orifice 128, which operates as a flow restriction, causes a pressure drop in the pressure level of the fluid. Thus, the pressure level of fluid in the main chamber 120 becomes lower than the pressure level of fluid received at the first port 112. As a result, fluid at the first port 112 applies a force on the distal end of the piston 118 in the proximal direction (e.g., to the left in FIG. 1) that is larger than the force applied by fluid in the main chamber 120 on the piston 118 in the distal direction (e.g., to the right in FIG. 1).

Due to such force imbalance on the piston 118, a net force is applied to the piston 118 in the proximal direction. When the net force overcomes the biasing force of the main spring 122 on the piston 118, the net force causes the piston 118 to move or be displaced axially in the proximal direction against the biasing force of the main spring 122. As mentioned above, the main spring 122 has a low spring rate, and thus a small pressure drop (e.g., when the pressure drop across the orifice 128 is about 25 psi) can cause the net force to overcome the biasing force of the main spring 122 on the piston 118.

Axial movement of the piston 118 in the proximal direction past edges of the main flow cross-holes 115A, 115B, causes the main flow cross-holes 115A, 115B to be exposed, thereby forming a main flow path to allow main flow directly from the first port 112 through the main flow cross-holes 115A, 115B to the second port 114. Such direct flow from the first port 112 to the second port 114 can be referred to as the main flow. As an example for illustration, the main flow rate can amount to up to 25 GPM based on the pressure relief setting of the valve 100 and the pressure drop between the first port 112 and the second port 114. The 25 GPM main flow rate is an example for illustration only. The valve 100 is scalable in size and different amounts of main flow rates can be achieved.

The second port 114 can be coupled to a low pressure reservoir or tank having fluid at low pressure level (e.g., atmospheric or low pressure level such as 10-70 psi). As such, pressurized fluid at the first port 112 is relieved to the tank through the second port 114, thereby precluding pressure level at the first port 112 from increasing further and protecting the hydraulic system from high pressure levels.

In some applications, it may be desirable to have a manual adjustment actuator coupled to the valve 100 so as to allow for manual modification of the preload of the setting springs 156, 160, while the valve 100 is installed in the hydraulic system without disassembling the valve 100. Modification of the preload of the setting springs 156, 160 causes modification of the pressure relief setting of the valve 100.

FIG. 1 illustrates the valve 100 having a manual adjustment actuator 168. The manual adjustment actuator 168 is configured to allow for adjusting a maximum pressure relief setting of the valve 100 without disassembling the valve 100. The manual adjustment actuator 168 includes a pin 170 disposed through the channel 205. The pin 170 is coupled to a spring cap 172 that interfaces with the first setting spring 156 of the valve 100. With this configuration, the spring cap 172 is movable via the pin 170 and can adjust the length of the first setting spring 156.

The manual adjustment actuator 168 includes an adjustment piston 174 that interfaces with or contacts the pin 170, such that longitudinal or axial motion of the adjustment piston 174 causes the pin 170 and the spring cap 172 coupled thereto to move axially therewith. The adjustment piston 174 can be threadedly coupled to a nut 176 at threaded region 178. The nut 176 in turn is threadedly coupled to the solenoid tube 140 at the threaded region 214. As such, the adjustment piston 174 is coupled to the solenoid tube 140 via the nut 176. Further, the adjustment piston 174 is threadedly coupled at threaded region 180 to another nut 182.

The adjustment piston 174 is axially movable within the second chamber 204 of the solenoid tube 140. For instance, the adjustment piston 174 can include an adjustment screw 184, such that if the adjustment screw 184 is rotated in a first rotational direction (e.g., clockwise) the adjustment piston 174 moves in the distal direction (e.g., to the right in FIG. 1) by engaging more threads of the threaded regions 178, 180. If the adjustment screw 184 is rotated in a second rotational direction (e.g., counter-clockwise) the adjustment piston 174 is allowed to move in the proximal direction (e.g., to the left in FIG. 1) by disengaging some threads of the threaded regions 178, 180.

While the distal end of the first setting spring 156 is coupled to or rests against a distal interior surface of the solenoid actuator sleeve 146, the proximal end of the first setting spring 156 rests against the spring cap 172, which is coupled to the adjustment piston 174 via the pin 170. As such, axial motion of the adjustment piston 174 results in a change in the length of the first setting spring 156.

FIG. 1 illustrates the valve 100 with the adjustment piston 174 disposed such that the setting springs 156, 160 are relaxed or uncompressed. In this position, the setting springs 156, 160 might not exert a biasing force on the pilot spring cap 162 or the pilot check member 138. This position can be referred to as a "minimum setting" position where fluid having a low pressure level (e.g., 25 psi) can generate pilot flow, thereby causing the piston 118 to move in the proximal direction as described above allowing main flow from the first port 112 to the second port 114. As depicted in FIG. 1, in this position, the armature 144 is axially positioned close to the pole piece 203 such that the airgap 152 is small. For instance, the airgap 152 can be about 0.02 inches.

Figure 4:
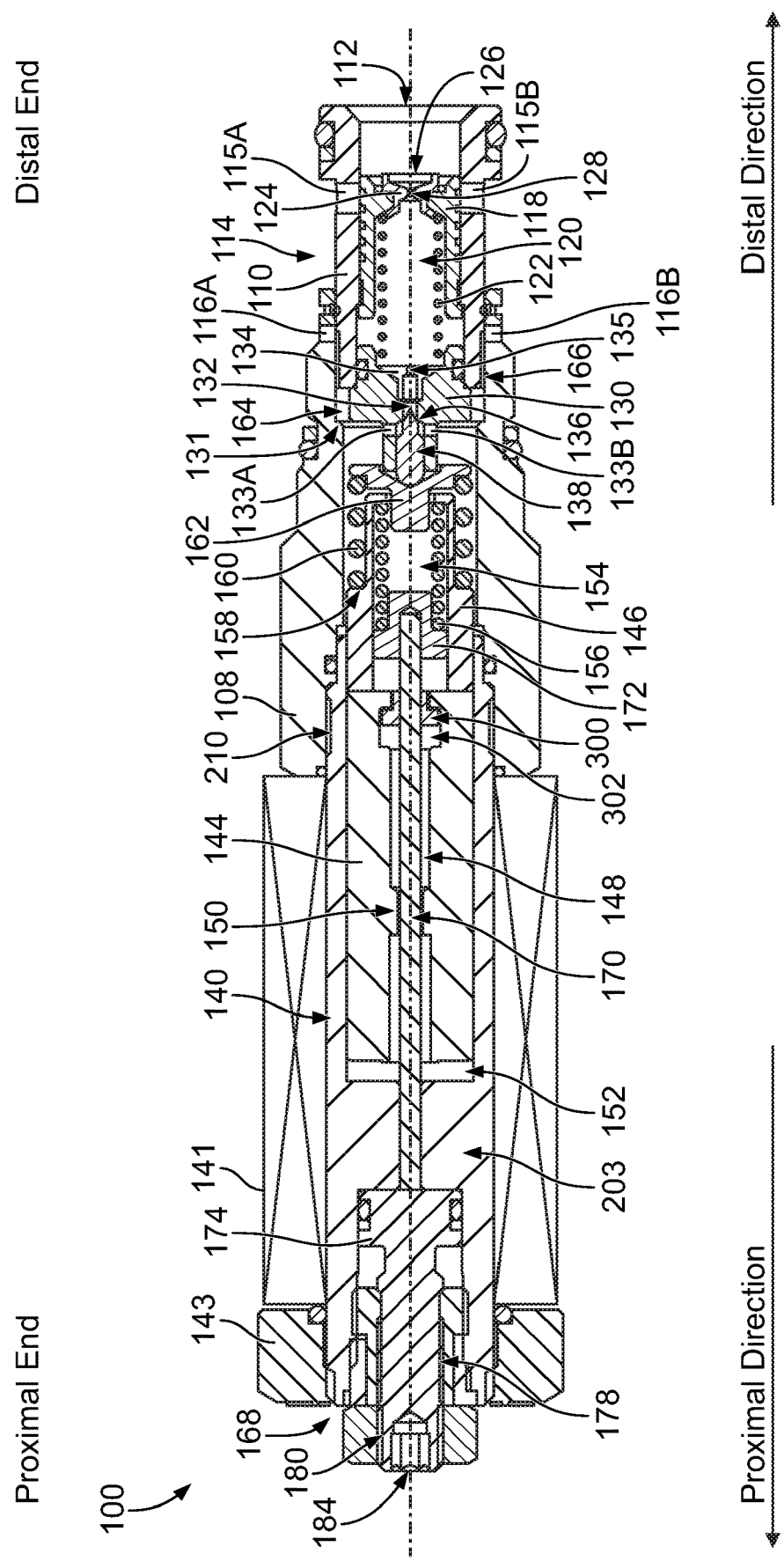
FIG. 4 illustrates the valve of FIG. 1 after moving an adjustment piston in a distal direction, in accordance with an example implementation.

FIG. 4 illustrates the valve 100 after moving the adjustment piston 174 in the distal direction, in accordance with an example implementation. If the adjustment screw 184 is rotated clockwise, for example, the adjustment piston 174 moves in the distal direction (e.g., to the right in FIG. 4). As the adjustment piston 174 moves in the distal direction, it pushes the pin 170, which in turn pushes the spring cap 172, in the distal direction, thereby compressing the first setting spring 156 against the distal interior surface of the solenoid actuator sleeve 146.

Due to compression of the first setting spring 156, the force it applies on the solenoid actuator sleeve 146 can increase to a particular force magnitude that can overcome friction forces acting on the solenoid actuator sleeve 146 and the armature 144 coupled thereto. As a result, the solenoid actuator sleeve 146 and the armature 144 coupled thereto can move axially in the distal direction, and the solenoid actuator sleeve 146 compresses the second setting spring 160 against the pilot spring cap 162.

As the setting springs 156, 160 are compressed, the biasing force applied to the pilot spring cap 162 and the pilot check member 138 increases. Further compression of the setting springs 156, 160 results in a larger biasing force on the pilot check member 138, thereby increasing the pressure relief setting of the valve 100, i.e., increasing the pressure level of fluid at the first port 112 that can overcome the biasing force. With this configuration, the maximum pressure relief setting of the valve 100 can be adjusted via the manual adjustment actuator 168 without disassembling the valve 100. As an example for illustration, the adjustment piston 174 can have a stroke of about 0.15 inches, which corresponds to a maximum pressure relief setting range between 0 psi and 5000 psi.

FIG. 4 depicts the adjustment piston 174 displaced axially all the way in the distal direction until it interfaces with the pole piece 203 and cannot move further. This position represents the highest maximum pressure relief setting position (e.g., 5000 psi). Comparing FIG. 4 to FIG. 1: (i) the spring cap 172 is moved by the pin 170 in the distal direction such that the distance or gap between the spring cap 172 and the armature 144 increases in FIG. 4 relative to FIG. 1; (ii) the armature 144 moves axially with the solenoid actuator sleeve 146 such that the airgap 152 increases in FIG. 4 relative to FIG. 1; and (iii) the axial distance between the distal end of the solenoid actuator sleeve 146 and the pilot spring cap 162 is decreased in FIG. 4 relative to FIG. 1. As an example for illustration, the spring rate $k_1$ can be about 80 lbf/in and the spring rate $k_2$ can be about 150 lbf/in, and if the adjustment piston 174 moves a distance of 0.15 inches, then the solenoid actuator sleeve 146 can move axially in the distal direction about 0.052 inches. In this position, the biasing force can be about 6.9 pounds leading to a pressure relief setting of 5000 psi when the diameter of the pilot seat 136 is about 0.042 inches.

As such, the manual adjustment actuator 168 sets a maximum pressure relief setting of the valve 100 once positions of the adjustment screw 184 and the adjustment piston 174 are set. During operation of the valve, the pressure relief setting of the valve 100 can be decreased from such maximum pressure relief setting by actuating the valve 100 via an electrical actuation signal to the solenoid coil 141. For example, if the maximum pressure relief setting is set to the highest value (e.g., 5000 psi) by moving the adjustment piston 174 axially until it interfaces with the pole piece 203, then sending an electrical signal to the solenoid coil 141 decreases the pressure relief setting down from the maximum pressure relief setting during operation of the valve 100.

When an electrical current is provided through the windings of the solenoid coil 141, a magnetic field is generated. The pole piece 203 directs the magnetic field through the airgap 152 toward the armature 144, which is movable and is attracted toward the pole piece 203. In other words, when an electrical current is applied to the solenoid coil 141, the generated magnetic field forms a north and south pole in the pole piece 203 and the armature 144, and therefore the pole piece 203 and the armature 144 are attracted to each other. Because the pole piece 203 is fixed and the armature 144 is movable, the armature 144 can traverse the airgap 152 toward the pole piece 203, and the airgap 152 is reduced in size. As such, a solenoid force is applied on the armature 144, where the solenoid force is a pulling force that tends to pull the armature 144 in the proximal direction. The solenoid force is proportional to a magnitude of the electrical command or signal (e.g., magnitude of electrical current or voltage applied to the solenoid coil 141).

The solenoid force applied to the armature 144 is also applied to the solenoid actuator sleeve 146, which is coupled to the armature 144 as described above. The solenoid actuator sleeve 146 in turn applies a compressive force in the proximal direction on the first setting spring 156, while allowing the second setting spring 160 to be relaxed (e.g., decompressed). As a result, the effective biasing force that the setting springs 156, 160 apply to the pilot spring cap 162 and the pilot check member 138 in the distal direction is reduced, and the pressure relief setting of the valve 100 is thus reduced.

Such reduction in the pressure relief setting when the solenoid coil 141 is energized can take place whether the valve 100 is open or closed and whether the armature 144 moves or not. Under some operating conditions, when the solenoid coil 141 is energized, and because the pole piece 203 is fixed and the armature 144 is movable, the armature 144 is pulled in the proximal direction and traverses the airgap 152 toward the pole piece 203. The armature 144 moves while the pin 170 does not move therewith. As the armature 144 is pulled in the proximal direction, the armature 144 causes the solenoid actuator sleeve 146 coupled thereto to move in the proximal direction as well. As the solenoid actuator sleeve 146 moves in the proximal direction, the spring cap 172 remains stationary as it is coupled to the pin 170, which does not move with the armature 144.

As a result of the motion of the solenoid actuator sleeve 146 in the proximal direction, the first setting spring 156 is compressed in the proximal direction and the second setting spring 160 is relaxed and is elongated. Thus, the effective biasing force that the setting springs 156, 160 apply to the pilot check member 138 via the pilot spring cap 162 in the distal direction is reduced. For example, the biasing force acting on the pilot check member 138 can be determined as the effective spring force of the setting springs 156, 160 minus the solenoid force applied by the armature 144 on the solenoid actuator sleeve 146 in the proximal direction. As a result of the reduction in the force applied to the pilot check member 138, the pressure relief setting of the valve 100 is reduced. Thus, the force that the pressurized fluid received at the first port 112 needs to apply on the pilot check member 138 to open the valve 100 is reduced.

Similarly, under static conditions (e.g., when the solenoid coil 141 but the armature 144 does not move), the solenoid force applied to the armature 144 is transferred to the solenoid actuator sleeve 146 and the first setting spring 156. As a result of the compressive force applied on the first setting spring 156 in the proximal direction and relaxation of the second setting spring 160, a reduction in the pressure relief setting of the valve 100 takes place despite absence of motion of the armature 144 or the solenoid actuator sleeve 146.

With this configuration, the pulling force (e.g., the solenoid force) of the armature 144 in the proximal direction assists the pressurized fluid received at the first port 112 in overcoming the force applied to the pilot check member 138 in the distal direction by the setting springs 156, 160. In other words, the force that the pressurized fluid received at the first port 112 needs to apply to the pilot check member 138 to cause it to be unseated and move axially in the proximal direction is reduced to a predetermined force value that is based on the solenoid force, which in turn is based on the magnitude of the electrical current (e.g., magnitude of the signal) provided to the solenoid coil 141. As such, the pulling force (i.e., the solenoid force) resulting from sending a signal to the solenoid coil 141 effectively reduces the pressure relief setting of the valve 100, and thus a reduced pressure level at the first port 112 can cause the valve 100 to open.

The larger the magnitude of the electrical signal, the larger the solenoid force and the lower the pressure relief setting of the valve 100. As such, the pressure relief setting of the valve 100 is reduced in proportion to the increase in the magnitude of the electrical signal. With this configuration, the valve 100 can be referred to as an inverse proportional pressure relief valve as an increase in magnitude of electrical command reduces the pressure relief setting proportionally.

Figure 5:
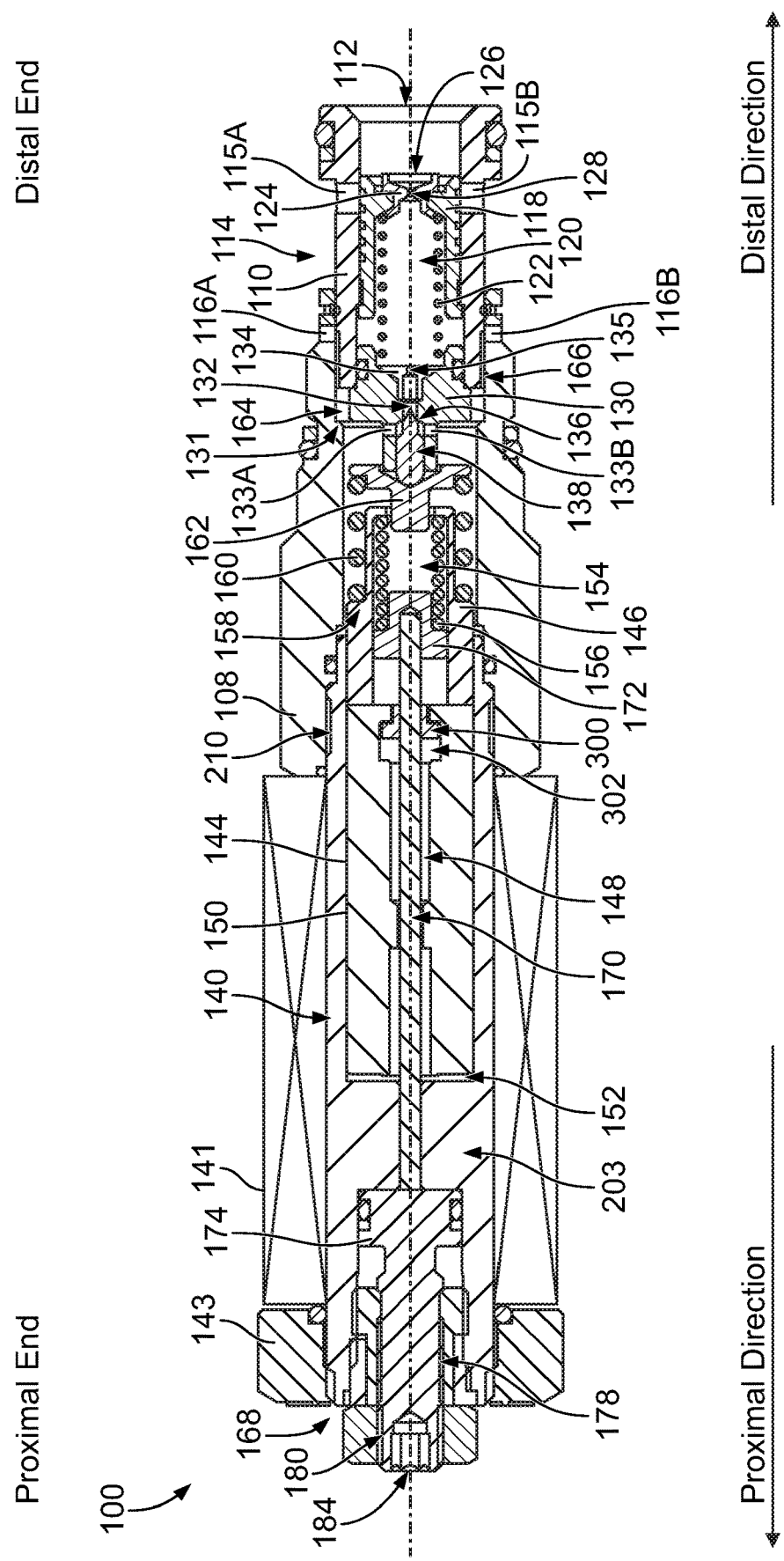
FIG. 5 illustrates the valve of FIG. 1 with a solenoid coil energized to an extent causing the valve to operate at a minimum pressure relief setting, in accordance with an example implementation.

The electrical signal can be increased in magnitude until the solenoid force reaches a particular magnitude that causes the valve 100 to have a minimum pressure relief setting. FIG. 5 illustrates the valve 100 with the solenoid coil 141 energized to an extent causing the valve 100 to operate at a minimum pressure relief setting, in accordance with an example implementation. When the solenoid force is sufficiently large (e.g., solenoid force of 12 lbf) the armature 144 and the solenoid actuator sleeve 146 move in the proximal direction compressing the first setting spring 156 and decompressing the second setting spring 160 to the extent shown in FIG. 5.

In this case, the second setting spring 160 can be substantially completely relaxed and the gap between the solenoid actuator sleeve 146 and the pilot spring cap 162 is similar to the gap therebetween depicted in FIG. 1. This way, the biasing force applied to the pilot check member 138 can be minimal (e.g., substantially zero). Further, the airgap 152 is also similar to the airgap 152 depicted in FIG. 1. However, as the armature 144 move in the proximal direction, the spring cap 172 in FIG. 5 remains displaced by the pin 170 compared to its position in FIG. 1.

Thus, although the manual adjustment actuator 168 is set at a maximum pressure relief setting with the adjustment piston 174 displaced axially all the way to the pole piece 203, energizing the solenoid coil 141 with a sufficiently large electrical signal can reduce the pressure relief setting of the valve to a minimum setting (e.g., 25 psi). An electrical signal having a magnitude between zero and the value causing the armature 144 to move to the position shown in FIG. 5 changes the pressure relief setting of the valve 100 to a value between the maximum pressure relief setting (e.g., 5000 psi) established by the manual adjustment actuator 168 and a minimum pressure relief setting (e.g., a setting between 0 and 25 psi).

In examples, the second setting spring 160 is configured to be stiffer (i.e., has a higher spring rate) than the first setting spring 156. For instance, the spring rate $k_1$ of the first setting spring 156 can be about 80 lbf/in, whereas the spring rate $k_2$ of the second setting spring 160 can be about 150 lbf/in. In this example, the equivalent spring rate $k_{eq}$ can be calculated as $k_{eq}=k_1/k_2=k_1+k_2=52.2$ lbf/inch. Thus, the equivalent spring rate $k_{eq}$ is less than either $k_1$ or $k_2$.

With this configuration, the second setting spring 160 effectively decouples or isolates the pilot check member 138 from the dynamics of the armature 144 and the solenoid actuator sleeve 146. The armature 144 can be subjected to friction forces and can be heavier in weight compared to the pilot check member 138. Thus, when an electrical current is applied to the solenoid coil 141 to move the armature 144, the armature 144 can be subjected to friction forces, stickiness, or oscillations. Such friction, stickiness, or oscillations can be transferred to the solenoid actuator sleeve 146 and the first setting spring 156. However, the presence of the second setting spring 160 may decouple or isolate the pilot check member 138 from such dynamics (e.g., friction, stickiness, or oscillations) of the armature 144. This way, the pilot check member 138 is less sensitive to dynamics of the armature 144.

Further, the configuration of the valve 100 having the setting springs 156, 160 in series causes an equivalent softer spring having the equivalent spring rate $k_{eq}$ being less than either $k_1$ or $k_2$ to act on the pilot check member 138. This way, high resolution or high accuracy axial displacements of the pilot check member 138 are achievable, while reducing the effects of the dynamics of the armature 144 on the pilot check member 138. For instance, displacements of about 0.001 inches of the pilot check member 138 can be achieved, and thus small amounts of pilot flow variation and correspondingly small amounts of main flow variation can be achieved.

Further, the pilot check member 138 is small in mass. As such, the effective mass of the pilot stage 104 (e.g., the combined mass of the pilot check member 138, the pilot spring cap 162, and the second setting spring 160) can be small (e.g., 2 grams). If the armature 144 is coupled rigidly or directly to the pilot check member 138, without the second setting spring 160 being disposed therebetween, then the effective mass of the pilot stage can be much larger (e.g., 25 grams), which is undesirable.

The combination of the pilot check member 138 being light (small in mass) and an equivalent spring that is softer than either of the setting springs 156, 160 causes the pilot check member 138 to have fast response time (e.g., high frequency response). A fast response time indicates that the pilot check member 138 can move to a commanded position off the pilot seat 136 in a shorter amount of time compared to a configuration where one stiff setting spring and a larger mass pilot check member are used.

Further, beneficially, with the configuration of the valve 100, neither of the setting springs 156, 160 is positioned within the pole piece 203, and therefore the presence of the setting springs 156, 160 does not limit the size of the pole piece 203 or limit the solenoid force that can be achieved when the solenoid coil 141 is energized. Thus, with the configuration of the valve 100, larger solenoid forces can be achieved. Larger solenoid forces are beneficial because wider or larger pressure relief ranges can be achieved. Further, with large spring rates of the setting springs 156, 160 and large solenoid forces, the effect of friction (between the armature 144 and the solenoid tube 140 and between the pilot check member 138 and the pilot seat member 130) on hysteresis can be reduced. Further, larger solenoid forces can allow for larger seat diameters of the pilot seat 136, thereby allowing for a large pilot flow if desired, and thus allowing for larger main flows.

Figure 6:
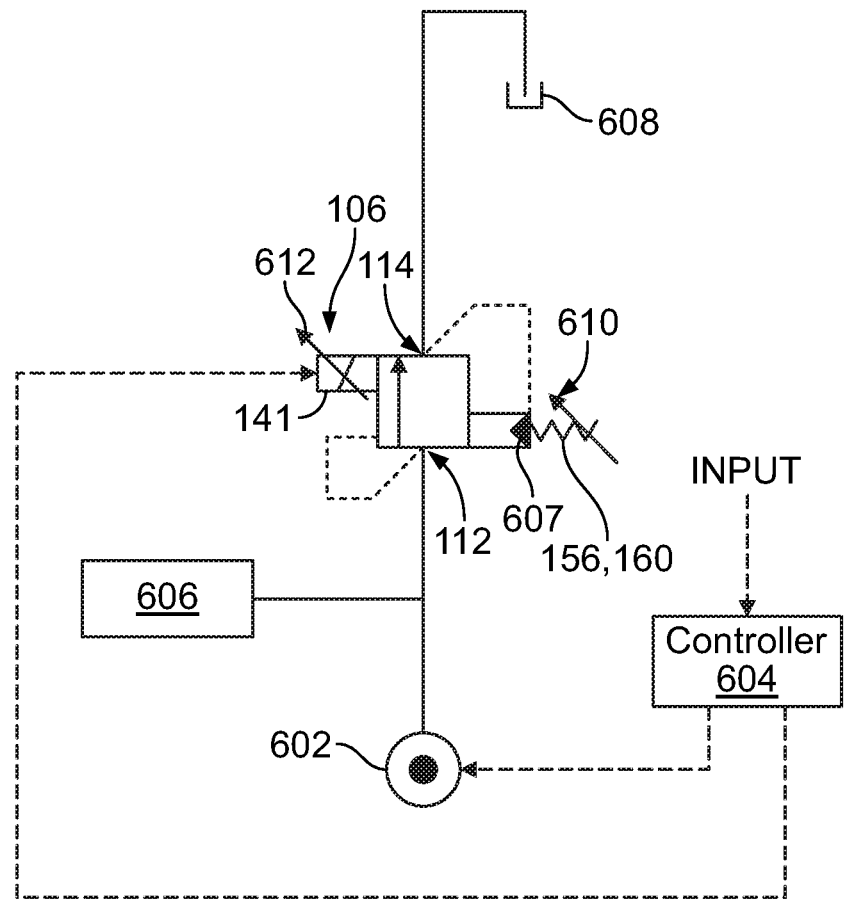
FIG. 6 illustrates a hydraulic system using the valve illustrated in FIG. 1, in accordance with an example implementation.

FIG. 6 illustrates a hydraulic system 600 using the valve 100, in accordance with an example implementation. The valve 100 is depicted symbolically in FIG. 6.

The hydraulic system 600 includes a source 602 of fluid. The source 602 of fluid can, for example, be a pump configured to provide fluid to the first port 112 of the valve 100. Such pump can be a fixed displacement pump, a variable displacement pump, or a load-sensing variable displacement pump, as examples. Additionally or alternatively, the source 602 of fluid can be an accumulator or another component (e.g., a valve) of the hydraulic system 600, such that the source 602 is fluidly coupled to the first port 112 of the valve 100.

As described above, when pressure level of fluid provided to the first port 112 is not sufficient to overcome the biasing force of the setting springs 156, 160 on the pilot check member, the valve 100 remains closed, thereby allowing pressure level to increase at the first port 112. In FIG. 6, the setting springs 156, 160 are represented by one equivalent or effective spring.

The hydraulic system 600 can further include a controller 604. The controller 604 can include one or more processors or microprocessors and may include data storage (e.g., memory, transitory computer-readable medium, non-transitory computer-readable medium, etc.). The data storage may have stored thereon instructions that, when executed by the one or more processors of the controller 604, cause the controller 604 to perform operations described herein. Signal lines to and from the controller 604 are depicted as dashed lines in FIG. 6. The controller 604 can receive input or input information comprising sensor information via signals from various sensors or input devices in the hydraulic system 600, and in response provide electrical signals to various components of the hydraulic system 600.

The controller 604 can receive a command or input information to reduce the pressure relief setting of the valve 100. For example, the valve 100 may operate at a high or maximum pressure relief setting to provide or divert flow at a high pressure level (e.g., 4000 psi) to other portions, components, equipment, or actuators of the hydraulic system 600. Such other portions, components, equipment, or actuators are represented in FIG. 6 by block 606. For instance, the block 606 can represent a hydraulic motor along with other components. When the valve 100 operates in unactuated and the pressure relief setting is set to a high pressure level, fluid from the source 602 is blocked at the first port 112 of the valve 100 and diverted to the hydraulic motor at the high pressure level so as to accelerate the hydraulic motor or provide high initial torque.

Once the hydraulic motor reaches a desired speed, a speed sensor can provide an indication to the controller 604 that the desired speed is reached. In response to the sensor information, the controller 604 can send a command signal to the solenoid coil 141 of the solenoid actuator 106 of the valve 100 to generate a solenoid force on the armature 144. When the solenoid force overcomes friction forces and the biasing force of the setting spring 156, the armature 144 and the solenoid actuator sleeve 146 can move in the proximal direction, such that the biasing force on the pilot check member 138 is reduced and the pressure relief setting is reduced as described above.

The pressure relief setting of the valve 100 can be reduced based on the magnitude of the electrical signal provided by the controller 604 to the solenoid coil 141 to a pressure relief setting that is less than the high pressure level. For instance, the pressure relief setting can be reduced to a value between 1000 and 3000 psi). This way, the valve 100 allows fluid to be provided to the hydraulic motor at a lower pressure level and maintain its speed.

If the pressure level of fluid supplied by the source 602 exceeds the pressure relief setting of the valve 100 such that pressurized fluid at the first port 112 overcomes the biasing force of the setting springs 156, 160, pressurized fluid unseats the pilot check member 138 and the pilot flow path is opened. Opening the pilot flow path allows pilot flow, symbolized by arrow 607 in FIG. 6, from the first port 112 to the second port 114 through the orifice 128, the main chamber 120, the orifice 135, the longitudinal channel 132, the radial cross-holes 133A, 133B, the longitudinal through-hole 164, the annular groove 166, and the pilot flow cross-holes 116A, 116B. The pilot flow allows the piston 118 to move, thereby allowing main flow from the first port 112 to the second port 114 via the main flow cross-holes 115A, 115B and relieving fluid from the first port 112 to the second port 114, which can be coupled to a tank 608.

As depicted symbolically in FIG. 6 by arrow 610, the biasing force of the setting springs 156, 160, and thus the maximum pressure relief setting of the valve 100, can be adjusted (e.g., via the manual adjustment actuator 168 as described above). Further, arrow 612 indicates that the solenoid force can be varied by varying the electrical signal provided to the solenoid coil 141 to change the pressure relief setting of the valve 100.

Figure 7:
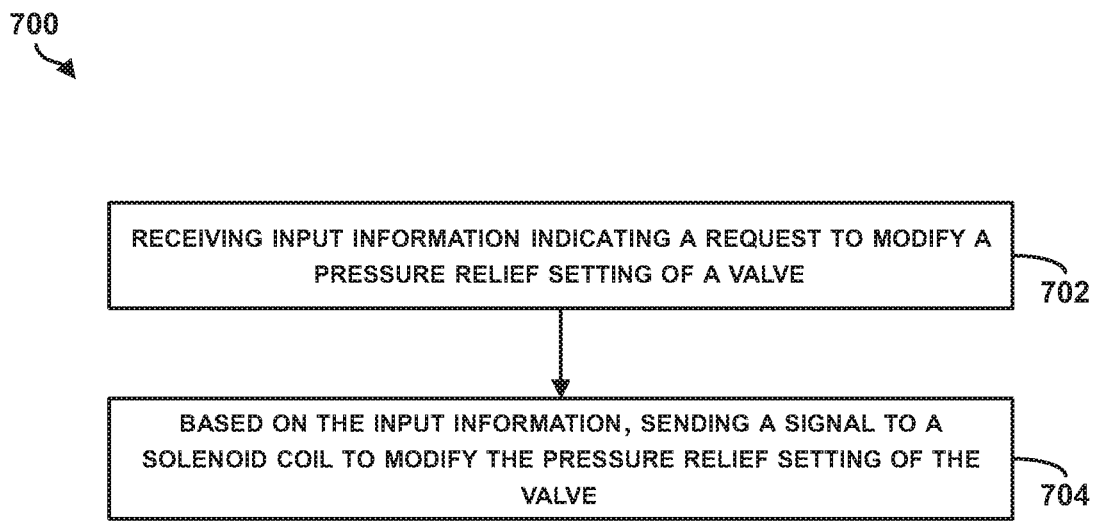
FIG. 7 is a flowchart of a method for controlling a hydraulic system, in accordance with an example implementation.

FIG. 7 is a flowchart of a method 700 for controlling a hydraulic system, in accordance with an example implementation. The method 700 can, for example, be performed by a controller such as the controller 604 to control the hydraulic system 600.

The method 700 may include one or more operations, or actions as illustrated by one or more of blocks 702-704. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 700 and other processes and operations disclosed herein, one or more blocks in FIG. 7 may represent circuitry or digital logic that is arranged to perform the specific logical operations in the process.

At block 702, the method 700 includes receiving input information indicating a request to modify a pressure relief setting of the valve 100.

At block 704, the method 700 includes, based on the input information, sending a signal to the solenoid coil 141 to modify the pressure relief setting of the valve 100. As described above, the controller 604 can provide a signal to the solenoid coil 141 to cause the armature 144 to apply a force on the solenoid actuator sleeve 146 in the proximal direction, thereby compressing the first setting spring 156 and decompressing the second setting spring 160 to change the biasing force acting on the pilot check member 138, and thus change the pressure relief setting of the valve 100. Reducing a magnitude of the signal can increase the pressure relief setting of the valve 100.

Figure 8:
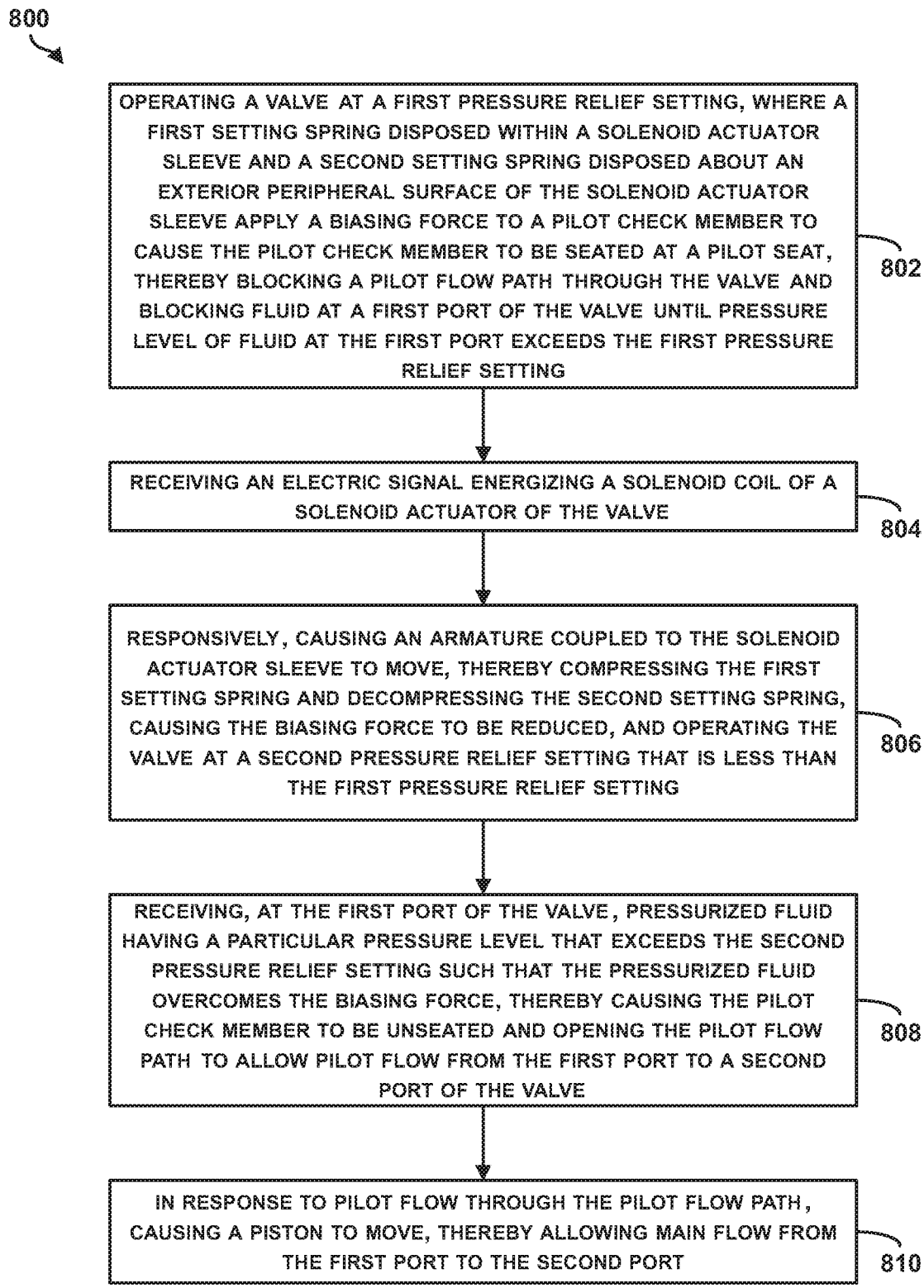
FIG. 8 is a flowchart of a method for operating a valve, in accordance with an example implementation.

FIG. 8 is a flowchart of a method 800 for operating a valve, in accordance with an example implementation. The method 800 shown in FIG. 8 presents an example of a method that can be used with the valve 100 shown throughout the Figures, for example. The method 800 may include one or more operations, functions, or actions as illustrated by one or more of blocks 802-810. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 802, the method 800 includes operating the valve 100 at a first pressure relief setting, where the first setting spring 156 disposed within the solenoid actuator sleeve 146 and the second setting spring 160 disposed about the exterior peripheral surface of the solenoid actuator sleeve 146 apply a biasing force to the pilot check member 138 to cause the pilot check member 138 to be seated at the pilot seat 136, thereby blocking a pilot flow path through the valve 100 and blocking fluid at the first port 112 of the valve 100 until pressure level of fluid at the first port 112 exceeds the first pressure relief setting.

At block 804, the method 800 includes receiving an electrical signal (e.g., from the controller 604) energizing the solenoid coil 141 of a solenoid actuator (e.g., the solenoid actuator 106) of the valve 100. The controller 604 can receive a request to modify or reduce the pressure relief setting of the valve 100. In response, the controller 604 sends the electrical signal to the solenoid coil 141 to energize it, or increase a magnitude of the electrical signal provided to the solenoid coil 141.

At block 806, the method 800 includes, responsively, causing the armature 144 coupled to the solenoid actuator sleeve 146 to move, thereby compressing the first setting spring 156 and decompressing the second setting spring 160, causing the biasing force to be reduced, and operating the valve 100 at a second pressure relief setting that is less than the first pressure relief setting.

At block 808, the method 800 includes receiving, at the first port 112 of the valve 100, pressurized fluid having a particular pressure level that exceeds the second pressure relief setting such that the pressurized fluid overcomes the biasing force, thereby causing the pilot check member 138 to be unseated and opening the pilot flow path to allow pilot flow from the first port 112 to the second port 114 of the valve 100.

At block 810, the method 800 includes, in response to pilot flow through the pilot flow path, causing the piston 118 to move, thereby allowing main flow from the first port 112 to the second port 114.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
    a pilot seat member comprising: (i) a channel that is fluidly coupled to a first port of the valve, (ii) a pilot seat, and (iii) one or more cross-holes fluidly coupled to a second port of the valve;
    a pilot check member configured to be seated at the pilot seat when the valve is closed to block fluid flow from the channel to the one or more cross-holes of the pilot seat member, wherein the pilot check member is configured to be subjected to a fluid force of fluid in the channel of the pilot seat member acting on the pilot check member in a proximal direction;
    a solenoid actuator sleeve comprising a chamber therein;
    a first setting spring disposed in the chamber within the solenoid actuator sleeve and configured to bias the solenoid actuator sleeve in a distal direction; and
    a second setting spring disposed about an exterior peripheral surface of the solenoid actuator sleeve and configured to bias the pilot check member in the distal direction, such that the first setting spring and the second setting spring cooperate to apply a biasing force in the distal direction on the pilot check member toward the pilot seat against the fluid force.

2. The valve of claim 1, wherein the solenoid actuator sleeve comprises a shoulder on the exterior peripheral surface of the solenoid actuator sleeve, and wherein a proximal end of the second setting spring rests against the shoulder, whereas a distal end of the second setting spring biases the pilot check member in the distal direction.

3. The valve of claim 2, further comprising:
    a pilot spring cap disposed between the solenoid actuator sleeve and the pilot check member, wherein a distal end of the pilot spring cap contacts the pilot check member, and wherein the distal end of the second setting spring contacts a proximal end of the pilot spring cap, such that the second setting spring biases the pilot check member in the distal direction via the pilot spring cap.

4. The valve of claim 1, wherein as pressure level of fluid received at the first port of the valve exceeds a particular pressure level based on respective spring rates of the first setting spring and the second setting spring, the fluid force overcomes the biasing force of the first setting spring and the second setting spring on the pilot check member, thereby causing the pilot check member to be unseated and enabling generation of a pilot flow from the first port to the second port via a pilot flow path formed through the channel and the one or more cross-holes of the pilot seat member.

5. The valve of claim 1, further comprising:
    a housing having a longitudinal cylindrical cavity therein and having one or more cross-holes disposed in an exterior peripheral surface of the housing; and a main sleeve disposed, at least partially, in the longitudinal cylindrical cavity of the housing, wherein the main sleeve includes the first port at a distal end of the main sleeve and includes one or more cross-holes disposed on an exterior peripheral surface of the main sleeve, wherein the one or more cross-holes of the housing and the one or more cross-holes of the main sleeve form the second port.

6. The valve of claim 5, further comprising:
a piston disposed within the main sleeve and configured to be axially movable therein, wherein the piston comprises a main chamber therein, and wherein the main chamber is fluidly coupled to the first port and the channel of the pilot seat member.

7. The valve of claim 6, wherein as pressure level of fluid received at the first port of the valve exceeds a particular pressure level based on respective spring rates of the first setting spring and the second setting spring, the fluid force overcomes the biasing force of the first setting spring and the second setting spring on the pilot check member, thereby causing the pilot check member to be unseated and enabling generation of a pilot flow from the first port to the second port via a pilot flow path, wherein the pilot flow path comprises: the main chamber of the piston, the channel of the pilot seat member, the one or more cross-holes of the pilot seat member, and wherein generation of the pilot flow causes the piston to move axially and open a main flow path from the first port to the second port to relieve fluid from the first port to the second port.

8. The valve of claim 7, wherein the pilot flow path further comprises (i) a longitudinal through-hole formed in the pilot seat member, (ii) an annular groove formed on an exterior peripheral surface of the main sleeve, and (iii) the one or more cross-holes of the housing.

9. The valve of claim 1, further comprising:
a solenoid actuator comprising a solenoid coil, a pole piece, and an armature that is mechanically coupled to the solenoid actuator sleeve, such that when the solenoid coil is energized, the armature and the solenoid actuator sleeve coupled thereto move axially in the proximal direction toward the pole piece, thereby compressing the first setting spring and decompressing the second setting spring and reducing the biasing force on the pilot check member.

10. The valve of claim 9, wherein the armature comprises a T-slot formed as an annular internal groove, wherein the solenoid actuator sleeve comprises a male T-shaped member, and wherein the T-slot of the armature is configured to receive the male T-shaped member of the solenoid actuator sleeve to mechanically couple the armature to the solenoid actuator sleeve.

11. The valve of claim 9, wherein the solenoid actuator further comprises a solenoid tube, and wherein the solenoid tube comprises: (i) a cylindrical body, (ii) a first chamber defined within the cylindrical body and configured to receive the armature of the solenoid actuator therein, and (iii) a second chamber defined within the cylindrical body, wherein the pole piece is formed as a protrusion within the cylindrical body, wherein the pole piece is disposed between the first chamber and the second chamber, and wherein the pole piece defines a respective channel therethrough, such that the respective channel of the pole piece fluidly couples the first chamber to the second chamber.

12. The valve of claim 11, further comprising:
a manual adjustment actuator having: (i) an adjustment piston disposed, at least partially, in the second chamber of the solenoid tube, (ii) a pin disposed through the respective channel of the pole piece and through the armature, wherein a proximal end of the pin contacts the adjustment piston and a distal end of the pin is coupled to a spring cap against which a proximal end of the first setting spring rests, such that axial motion of the adjustment piston causes the pin and the spring cap coupled thereto to move axially, thereby adjusting the biasing force on the pilot check member.

13. A hydraulic system comprising:
a source of fluid;
a tank; and
a valve having a first port fluidly coupled to the source of fluid, and a second port fluidly coupled to the tank, wherein the valve comprises:
a pilot seat member comprising: (i) a channel that is fluidly coupled to the first port of the valve, (ii) a pilot seat, and (iii) one or more cross-holes fluidly coupled to the second port of the valve,
a pilot check member configured to be subjected to a fluid force of fluid in the channel of the pilot seat member acting on the pilot check member in a proximal direction,
a solenoid actuator sleeve comprising a chamber therein,
a first setting spring disposed in the chamber within the solenoid actuator sleeve and configured to bias the solenoid actuator sleeve in a distal direction, and
a second setting spring disposed about an exterior peripheral surface of the solenoid actuator sleeve and configured to bias the pilot check member in the distal direction, such that the first setting spring and the second setting spring cooperate to apply a biasing force in the distal direction on the pilot check member toward the pilot seat against the fluid force.

14. The hydraulic system of claim 13, wherein the solenoid actuator sleeve of the valve comprises a shoulder on the exterior peripheral surface of the solenoid actuator sleeve, and wherein a proximal end of the second setting spring rests against the shoulder, whereas a distal end of the second setting spring biases the pilot check member in the distal direction.

15. The hydraulic system of claim 13, wherein the valve further comprises:
a housing having a longitudinal cylindrical cavity therein and having one or more cross-holes disposed in an exterior peripheral surface of the housing;
a main sleeve disposed, at least partially, in the longitudinal cylindrical cavity of the housing, wherein the main sleeve includes the first port at a distal end of the main sleeve and includes one or more cross-holes disposed on an exterior peripheral surface of the main sleeve, wherein the one or more cross-holes of the housing and the one or more cross-holes of the main sleeve form the second port; and
a piston disposed within the main sleeve and configured to be axially movable therein, wherein the piston comprises a main chamber therein, and wherein the main chamber is fluidly coupled to the first port and the channel of the pilot seat member.

16. The hydraulic system of claim 13, further comprising:
a solenoid actuator comprising (i) a solenoid coil, (ii) a pole piece, (iii) an armature that is mechanically coupled to the solenoid actuator sleeve such that when the solenoid coil is energized, the armature and the solenoid actuator sleeve coupled thereto move axially in the proximal direction toward the pole piece, thereby compressing the first setting spring and decompressing the second setting spring and reducing the biasing force on the pilot check member, and (iv) a solenoid tube, wherein the solenoid tube comprises: (i) a cylindrical body, (ii) a first chamber defined within the cylindrical body and configured to receive the armature of the solenoid actuator therein, and (iii) a second chamber defined within the cylindrical body, wherein the pole piece is formed as a protrusion within the cylindrical body, wherein the pole piece is disposed between the first chamber and the second chamber, and wherein the pole piece defines a respective channel therethrough, such that the respective channel fluidly couples the first chamber to the second chamber; and a manual adjustment actuator having: (i) an adjustment piston disposed, at least partially, in the second chamber of the solenoid tube, (ii) a pin disposed through the respective channel of the pole piece and through the armature, wherein a proximal end of the pin contacts the adjustment piston and a distal end of the pin is coupled to a spring cap against which a proximal end of the first setting spring rests, such that axial motion of the adjustment piston causes the pin and the spring cap coupled thereto to move axially, thereby adjusting the biasing force on the pilot check member.

17. The hydraulic system of claim 13, wherein as pressure level of fluid received at the first port of the valve exceeds a particular pressure level based on respective spring rates of the first setting spring and the second setting spring, the fluid force overcomes the biasing force of the first setting spring and the second setting spring on the pilot check member, thereby causing the pilot check member to be unseated and enabling generation of a pilot flow from the first port to the second port via a pilot flow path formed through the channel and the one or more cross-holes of the pilot seat member.

18. A valve comprising:
a housing having a longitudinal cylindrical cavity therein and having one or more cross-holes disposed in an exterior peripheral surface of the housing;
a main sleeve disposed, at least partially, in the longitudinal cylindrical cavity of the housing, wherein the main sleeve includes a first port at a distal end of the main sleeve and includes one or more cross-holes disposed on an exterior peripheral surface of the main sleeve, wherein the one or more cross-holes of the housing and the one or more cross-holes of the main sleeve form a second port;
a piston disposed within the main sleeve and configured to be axially movable therein, wherein the piston comprises a main chamber therein, wherein the main chamber of the piston is fluidly coupled to the first port;
a pilot seat member comprising: (i) a channel that is fluidly coupled to the first port of the valve, (ii) a pilot seat, and (iii) one or more cross-holes fluidly coupled to the second port of the valve, wherein the main chamber of the piston is fluidly coupled to the channel of the pilot seat member;
a pilot check member configured to be subjected to a fluid force of fluid in the channel of the pilot seat member acting on the pilot check member in a proximal direction;
a solenoid actuator sleeve comprising a chamber therein;
a first setting spring disposed in the chamber within the solenoid actuator sleeve and configured to bias the solenoid actuator sleeve in a distal direction; and
a second setting spring disposed about an exterior peripheral surface of the solenoid actuator sleeve and configured to bias the pilot check member in the distal direction, such that the first setting spring and the second setting spring cooperate to apply a biasing force in the distal direction on the pilot check member toward the pilot seat against the fluid force.

19. The valve of claim 18, wherein as pressure level of fluid received at the first port of the valve exceeds a particular pressure level based on respective spring rates of the first setting spring and the second setting spring, the fluid force overcomes the biasing force of the first setting spring and the second setting spring on the pilot check member, thereby causing the pilot check member to be unseated and enabling generation of a pilot flow from the first port to the second port via a pilot flow path, wherein the pilot flow path comprises: the main chamber of the piston, the channel of the pilot seat member, the one or more cross-holes of the pilot seat member, and wherein generation of the pilot flow causes the piston to move axially and open a main flow path from the first port to the second port to relieve fluid from the first port to the second port.

20. The valve of claim 19, wherein the pilot flow path further comprises (i) a longitudinal through-hole formed in the pilot seat member, (ii) an annular groove formed on an exterior peripheral surface of the main sleeve, and (iii) the one or more cross-holes of the housing.

* * * * *